United States Patent
Billerot

(10) Patent No.: US 6,251,336 B1
(45) Date of Patent: Jun. 26, 2001

(54) INSTALLATION FOR METAL CUTTING PROVIDED WITH A CUTTING TORCH AND A CAPACITATIVE SENSING PROBE

(75) Inventor: Francis Billerot, Saint-Aubin-le-Cloud (FR)

(73) Assignee: Safmatic, Parthenay Cedex (FR)

( * ) Notice: Subject to any disclaimer, the term of this patent is extended or adjusted under 35 U.S.C. 154(b) by 0 days.

(21) Appl. No.: 09/457,572

(22) Filed: Dec. 9, 1999

(30) Foreign Application Priority Data

Dec. 10, 1998 (FR) .................................................. 98 15593

(51) Int. Cl.$^7$ ...................................................... B23K 7/10
(52) U.S. Cl. ............................................... 266/76; 266/48
(58) Field of Search .................... 266/48, 76; 219/124.02

(56) References Cited

U.S. PATENT DOCUMENTS

| 3,017,496 | 1/1962 | Greene . | |
|---|---|---|---|
| 3,032,328 | * 5/1962 | Petersen et al. | 266/76 |
| 4,280,042 | * 7/1981 | Berger et al. | 219/124.02 |
| 4,333,052 | * 6/1982 | Schmall | 266/76 |
| 4,773,946 | * 9/1988 | Griebeler | 266/76 |
| 4,795,882 | * 1/1989 | Hardwick et al. | 219/124.02 |

OTHER PUBLICATIONS

Karl Heinz Schmall, "Sensoren für Schweiss –und Schneidvorgänge," Automobil–Industrie, No. 4, Dec. 1982, pp. 435–442.

* cited by examiner

Primary Examiner—Scott Kastler
(74) Attorney, Agent, or Firm—Young & Thompson

(57) ABSTRACT

Installation for working, in particular for cutting or welding, at least one metal piece. The installation includes a fixed support frame provided with a movable working torch and a sensing device. The sensing device includes a capacitative probe and drive means. The installation also includes a first elongated and electrically conductive connection connected at an upstream end of the first connection to the drive means and at a downstream end of the first connection to the capacitative probe. A second elongated and electrically conductive connection is connected at an upstream end of the second connection to the drive means and a downstream end of the second connection is free.

10 Claims, 3 Drawing Sheets

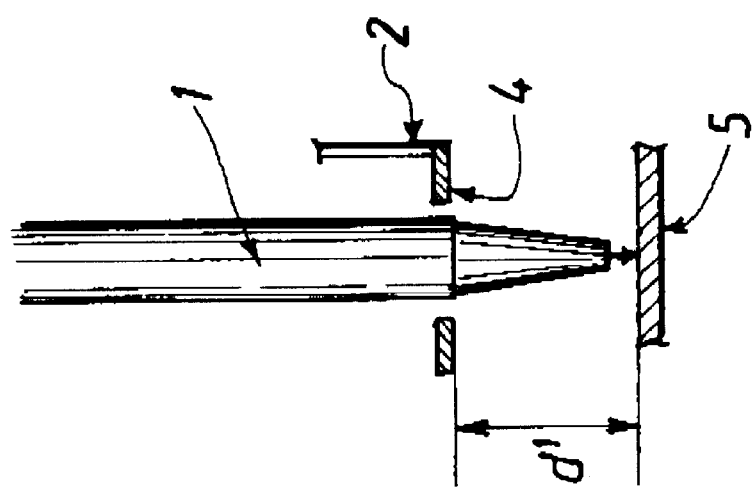
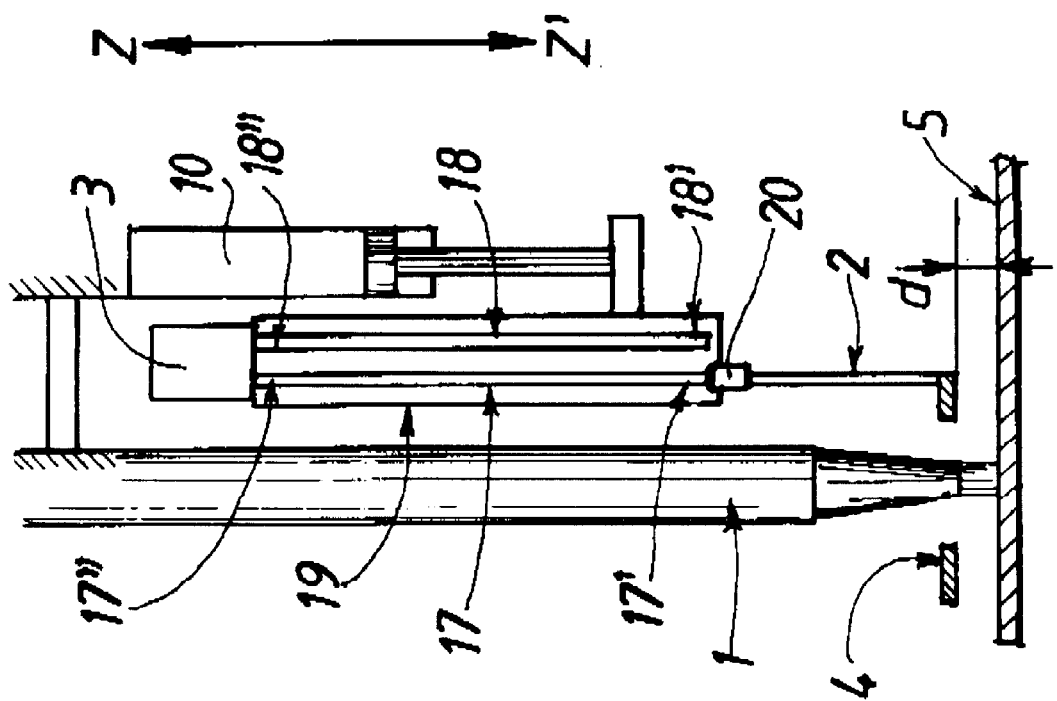

INSTALLATION FOR METAL CUTTING PROVIDED WITH A CUTTING TORCH AND A CAPACITATIVE SENSING PROBE

BACKGROUND OF THE INVENTION

The invention relates to a machine for working, in particular cutting, metallic pieces using, on the one hand, a working torch, in particular a plasma cutting torch, and, on the other hand, a capacitative sensing probe used to determine and adjust the distance separating said torch from the workpiece, in particular to be cut.

Conventionally, when it is desired to carry out a cutting or welding of one or several metallic pieces by means of an automatic machine comprising a working torch, such as a welding or cutting torch, there is used a system for determining and regulating the distance separating the torch from the piece to be cut or welded.

The operation for determining and adjusting the tool/workpiece distance is now called sensing.

At present, the sensing systems used in cutting installations incorporating an automatic plasma cutting torch are detectors in the form of rings called capacitative probes.

During their operation, these systems do not require direct contact between the detector and the metallic sheet or piece to be worked on, particularly to be cut.

Thus, the manner of operation of this type of capacitative probe is based on a determination of the value of capacitance existing in the space or interval separating the capacitative probe from the sheet to be worked on.

After determination, the value of capacitance is transmitted to an electronic drive system which takes account of this value of capacitance to control a slave device permitting moving the torch and the capacitative probe fixed to the latter, which is to say the torch/capacitative probe assembly, in a plane substantially parallel to the plane of the workpiece, by maintaining a substantially constant value of capacitance and hence a distance which is also equal, between the torch and the workpiece.

In other words, a sensing device for an automatic cutting or welding machine for metal comprises, in general, a capacitative probe, conventionally in the form of a ring, fixed to the torch, and an electric connection cable permitting connection between the capacitative probe and the drive means.

However, so as to be able to maintain a substantially constant distance between the tool, which is to say the torch, and the metallic workpiece, it is necessary that the value of capacitance of the capacitative probe not be disturbed during its operation by variations of parasitic capacitances and this despite the unfavorable environment, namely particularly high temperature, generated smoke and projections of molten metal.

Thus, the value of the capacitance prevailing between the capacitative probe and the piece to be cut is only several picofarads, which is a very low value.

However, the value of the parasitic capacitance of a connecting cable is conventionally 10 to 100 times greater than that of the useful measurement, and this is true even when care is taken to use special coaxial cables, which is to say cables with very low intrinsic capacitance.

It will therefore be easily understood that, to carry out a capacitance measurement under these conditions, is not an easy matter.

Moreover, during a cutting operation, the capacitative probe frequently receives, at the moment of striking the arc, molten metal bits which can fix on the latter, thus giving rise to an untimely variation in the value of capacitance and hence an undesired movement of the torch relative to the workpiece, from which displacement can result a substantial drop in the quality of the cut, for example an undesirable adherence of slag on the edges of the fillet, an inappropriate or inadequate width and/or straightness of the cut fillet.

Moreover, the capacitative probe and its connection cable are usually also subjected to fairly large variations of temperature which give rise to a change in the characteristics of their dielectric and hence, in an analogous manner, a variation of the value of capacitance, and correspondingly of the sensing height.

The problem is therefore to be able to have a reliable and precise system for measuring the value of capacitance which does not have the above drawbacks, which is to say to be able to provide an effective sensing system which will not be affected in particular by parasitic capacitances arising from connection cables or the like.

SUMMARY OF THE INVENTION

The present invention thus relates to an installation for working, in particular cutting or welding, at least one metallic workpiece, comprising:

at least one support frame provided with at least one movable working torch;

at least one sensing device comprising at least one capacitative probe and drive means, characterized in that it moreover comprises:

first elongated and electrically conductive connection means connected by an upstream end to said drive means and by a downstream end to said capacitative probe, and a second elongated and electrically conductive connection means, connected by its upstream end to said drive means and whose downstream end is free.

As the case may be, the installation according to the invention comprises one or several of the following characteristics:

said first and second connection means have approximately the same dielectric properties or characteristics, which is to say that the dielectric of the first connection means is approximately equal or equivalent to the dielectric of the second connection means.

the first connection means has a first length L1 and the second connection means has a second length L2, said first and second lengths L1, L2 being substantially equal;

the first and second lengths L1, L2 are comprised between 20 cm and 150 cm;

the first and second connection means are separated by a distance D comprised between about 2 mm and about 30 mm;

said first and second connection means are constituted of the same material and/or have a same cross-section;

the first and second connection means are selected from cables and metallic rods, preferably the first and second connection means are two parallel metallic rods;

at least one portion of said first and second connection means is disposed within a protective envelope, preferably a metallic protective tube;

the capacitative probe is fixed to the cutting or welding torch, preferably by means of an articulation or a flexible member;

the torch is selected from laser cutting torches, plasma cutting torches and oxycutting torches.

Moreover, the invention also relates to a monobloc assembly adapted to constitute a sensing device as mentioned above.

Furthermore, the invention also relates to a process to maintain substantially constant the distance d separating a working torch from a workpiece, in which:

(a) the value of capacitance C1 representative of the height separating the torch from the workpiece is measured;

(b) the value of capacitance C1 measured in step (a) at a predetermined value C of capacitance representative of the desired distance d is compared;

(c) when C1 differs from C, a displacement of the torch is carried out relative to the workpiece and steps (a) to (c) are repeated until C1=C.

BRIEF DESCRIPTION OF THE DRAWING

The invention will now be described in greater detail with the help of two embodiments, given by way of illustrative example but not limiting, and with reference to the accompanying drawings in which:

FIG. 2 shows a second embodiment of the invention;

FIG. 3 shows the starting position of a piece to be cut;

DESCRIPTION OF THE PREFERRED EMBODIMENT

Figure 1:
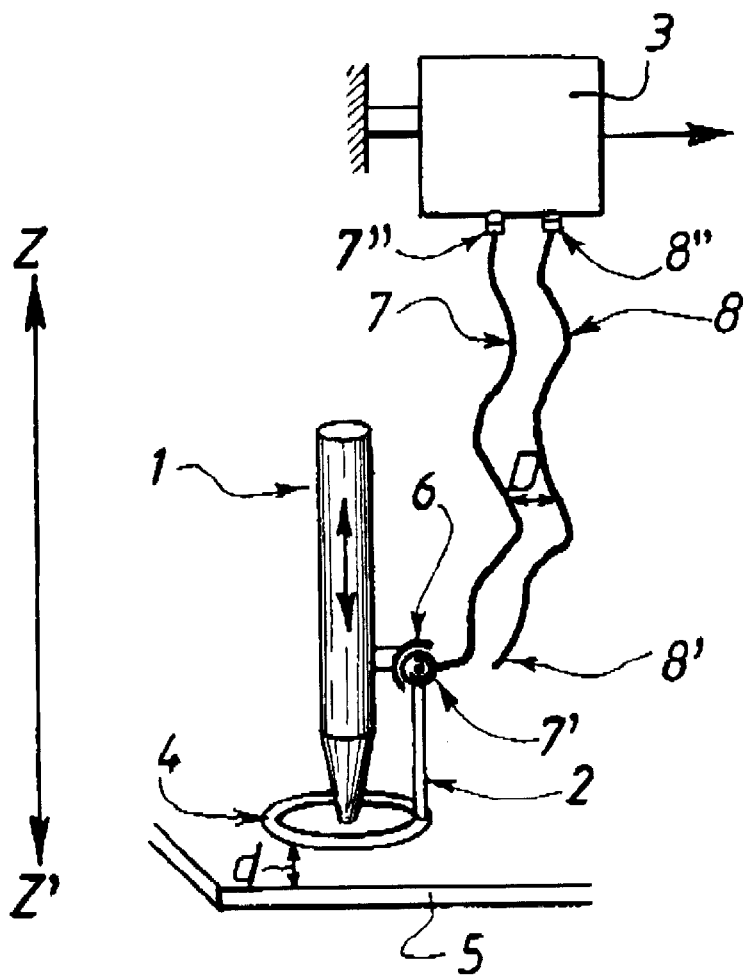
FIG. 1 is a schematic view of a first embodiment of the invention.

FIG. 1 is a schematic view of a first embodiment of an installation according to the invention, which comprises a cutting torch in row 1 movable along a vertical axis (z, z') and provided with a sensing device comprising on the one hand a sensing capacitative probe 2 and, on the other hand, drive means 3 comprising an electronic housing, which is to say a control of the height d separating the torch 1 from the upper surface of the metallic workpiece, and a conventional determination system acting on the motorized displacement system permitting displacing the torch 1 until the probe 2 connected to the torch 1 measures the desired value of capacitance representing the desired height d and fixed by the height control.

As will be seen in FIG. 1, the capacitative probe 2 comprises an end portion in the shape of a ring 4 surrounding the downstream end of the torch 1, which is to say the end of the torch 1 nearest the piece 5 to be cut.

The probe 2 is fixed to the torch 1 by means of an articulation 6 such that the downstream end of the torch 1 can position itself within the ring 4.

A first connection cable 7 is fixed by its downstream end 7' to the capacitative probe 2 and by its upstream end 7" to the electronic housing 3.

Similarly, a second cable 8, preferably parallel to the first cable 7 has itself its upstream end 8" also connected to the electronic housing 3 and its downstream end 8' free.

By "parallel" is meant that the distance D separating the two cables 7 and 8 is substantially constant, but that the two cables 7 and 8 are not necessarily straight.

According to the present invention, two cables 7 and 8 are selected having respectively identical or very close dielectric properties, one to the other, preferably identical to each other.

Preferably, the distance D separating the first cable 7 from the second cable 8 is of the order of 20 to 50 mm, preferably of the order of 30 mm, such that the two cables 7 and 8 will be in the same local working environment, which is to say subjected to the same constraints.

FIG. 2 shows a second embodiment of an installation according to the invention, in all ways analogous to that of FIG. 1, except that, according to FIG. 2, the first and second flexible cables 7 and 8 of FIG. 1 have been replaced by two metallic rods 17 and 18.

More precisely, the first rod 17 permits connecting the capacitative probe 2 to the electronic housing 3, whilst the second metallic rod 18 is connected only by its upstream end to the housing 3, its downstream end being free.

The two metallic rods 17 and 18 are moreover disposed in parallel within a protective envelope, such as a metallic tube 19, which serves as a screen to any external condition that could cause the capacitance of one or the other of said rods 17 and 18 to vary.

Preferably, the rods 17 and 18 have the same dielectric characteristics, which is to say that the rods 17 and 18 are selected to be substantially identical, namely rods of the same material, for example rods of stainless steel.

In other words, the rods 17 and 18 form, with the tube 19, two substantially identical capacitances subjected to very similar variations as a function of the variations of the local environment, particularly the constraints of temperature, humidity, atmospheric composition . . .

For example, when the ambient temperature varies, the temperature of the two rods 17 and 18 varies analogously, which results in not disturbing the measurement of capacitance, because the values of the respective capacitances of each of the two rods 17 and 18 vary in the same way and in parallel relative to the tube 19.

Moreover, it will be seen from FIG. 2 that, according to this embodiment, the capacitative probe 2 is fixed at the downstream end of the metallic rod 17 by means of a flexible metallic piece 20, so as to avoid parasitic capacitances and other problems of electrical contact.

Moreover, it will also be seen that the drive means, which is to say the measuring electronics, are disposed in an electronic housing 3, which electronic housing 3 is directly fixed above the two metallic rods 17 and 18, which again permits avoiding or minimizing parasitic capacitances and other problems of electrical contact.

Preferably, the assembly constituted by the capacitative probe 2, the metallic rods 17 and 18 and the electronic housing 3 is fixed on a raising and lowering system 10 along the axis (z, z'), for example a pneumatic jack system permitting spacing the capacitative probe 2 from the sheet 5 to be cut at the moment of starting to cut and thereby avoiding the capacitative probe 2 being damaged or disturbed by projections of slag.

In other words, during starting, the system 10 is controlled to give rise to a momentary spacing of the ring 4 from the sheet to be cut; the sensing device being itself momentarily immobilized, as shown in FIG. 3.

Thus, it will be noted, upon comparing FIGS. 2 and 3, that the ring 4 of the sensing probe 2 is located farther from the piece 5 to be cut, when the torch 1 is in the position of starting the cut (FIG. 3) and when the latter is in the working position, which is to say for cutting properly so-called (FIG. 2).

Thus, in the starting position, the distance d' between the ring 4 and the piece 5 is substantially greater than the distance d' between the ring 4 and the piece 5 in the cutting position.

The embodiment of FIG. 2 has a great advantage relative to the embodiment of FIG. 1, given, in the case of FIG. 2, that the monobloc assembly constituted by the capacitative probe 2, the rods 17 and 18 and the electronic housing 3 form a monobloc assembly which can be moved without varying the equilibrium of the values of parasitic capacitance.

It is to be noted that the installation according to the present invention can be provided with several torches, such as laser or plasma cutting torches.

Figure 4:
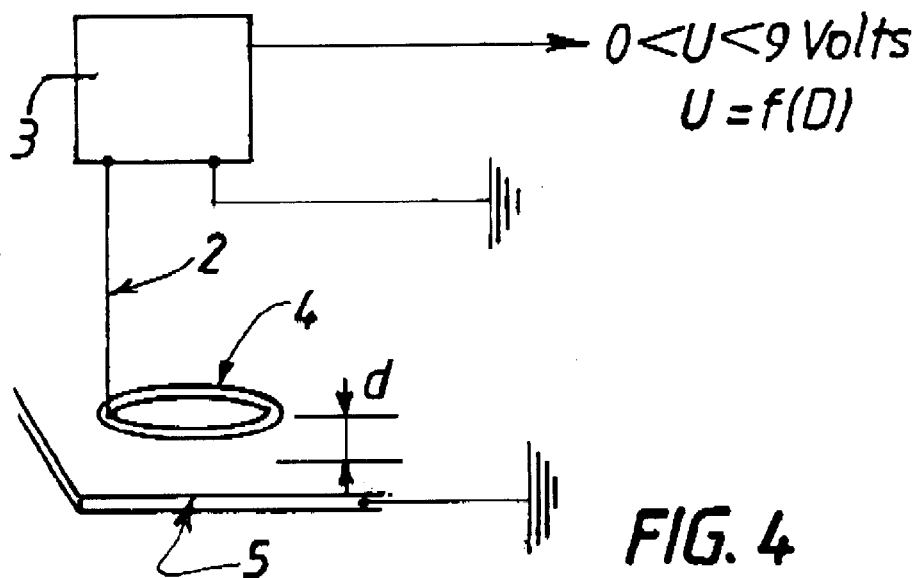
FIGS. 4 and 5 show the principle of operation of a capacitative probe and of an electronic housing or drive means.
Figure 5:
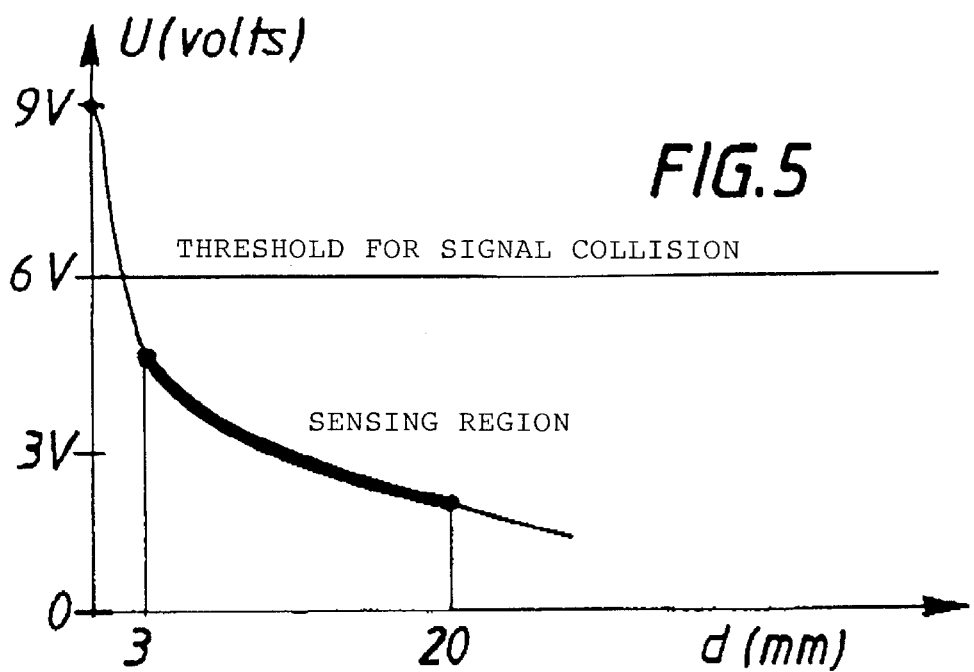

FIGS. 4 and 5 themselves show the principle of operation of the capacitative probe 2 and of the electronic housing 3 or drive means.

As mentioned above, a capacitative probe 2 is a detection member permitting detecting the value of capacitance in the space located between the ring 4 of the probe and the workpiece 5, this value of capacitance being measured by the electronic determination housing 3, then transformed into a datum representative of the electrical voltage.

As shown in FIG. 5, it will be seen that the image of the distance d separating the ring 4 of the capacitative probe 2 from the workpiece 5, can be shown by a voltage value U (in volts) which increases when the distance d (in mm) decreases.

It will be seen in FIG. 5, that the voltage U decreases from 9 volts to 2 volts, when the distance d increases progressively from 0 to 20 mm.

Thus, for a voltage of about 5 volts, the distance is about 3 mm, whilst for a voltage of 2 volts, the distance d is about 20 mm, in this case.

In other words, the electric voltage U varies by abruptly increasing when the distance d becomes very small.

In view of the above, it is also possible to use the geometric shape and the position of the capacitative probe 2 as a detection device for collision in addition to its initial function of sensing.

Thus, during an operation of cutting a metallic workpiece, the cutting torch moves ordinarily in a plane (x, x', y, y') parallel to the sheet 5 to be cut, and the distance d between the end of the cutting torch 1, and hence between the probe 2 and the sheet 5 to be cut, is generally comprised between 5 and 20 mm according to the power to be used.

Figure 6:
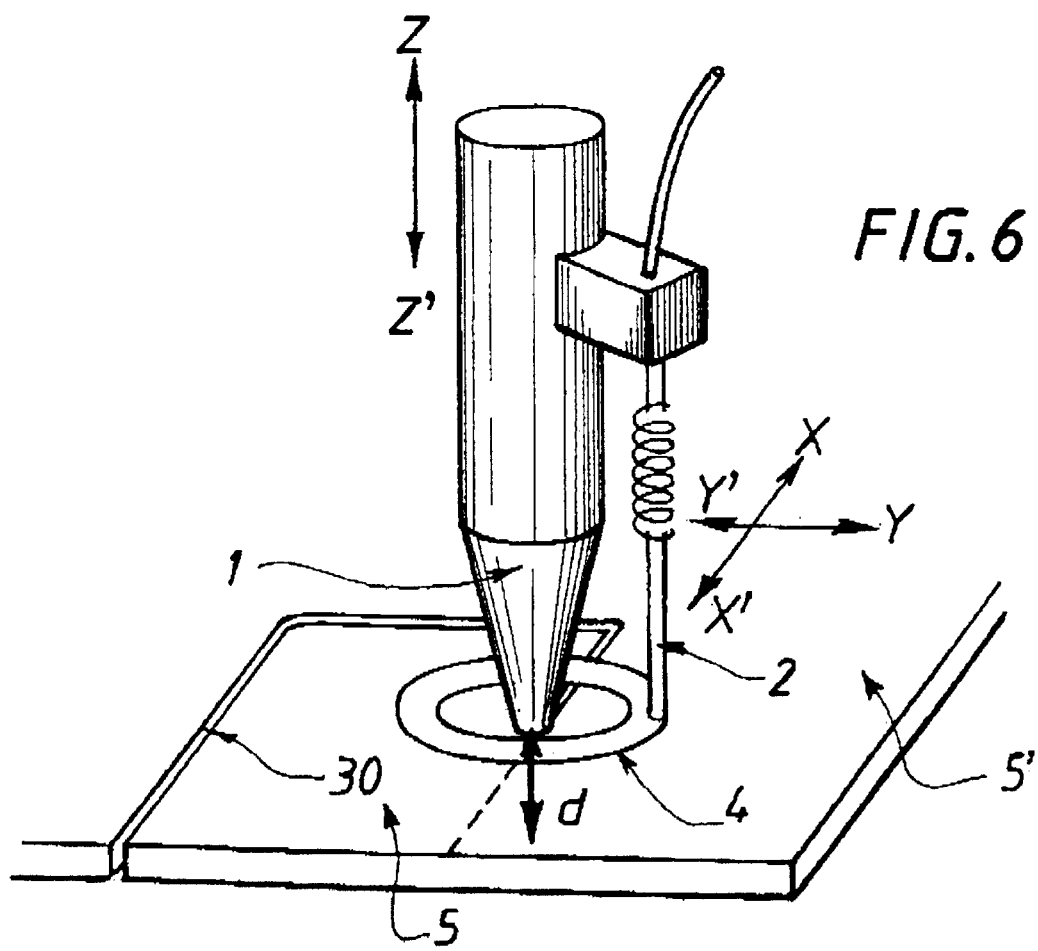
FIG. 6 shows a cutting torch forming a slot.

Such a cutting operation of piece 5 out of a sheet 5' of larger dimensions, has been shown in FIG. 6 in which there will be seen a cutting torch 1 forming a slot 30 within the sheet 5'.

Said torch 1 is maintained at a substantially constant distance d from the sheet 5' thanks to a sensing system comprising a capacitative probe 2 provided with an end ring 4. This sensing system is directly fixed on the body of torch 1 and moves with said torch 1 in the plane (x, x', y, y') or vertically along the axis (z, z').

Immediately after having been cut, the pieces 5 do not remain motionless and abruptly swing on the support or the cutting table, before the sensing device 2, 4 has had the time to retract the torch 1.

There can thus result collisions between the torch 1 and/or the probe 2, 4 and the piece 5 during its swinging, which collisions are dangerous to the torch 1 and/or to the probe and adapted to cause an untimely stopping of the installation, repair costs and loss of productivity.

To overcome this, it is possible to use the capacitative probe 2 as a system for detection of collision between the torch 1 and the probe 2, on the one hand, and the sheet 5 or the pieces to be cut, on the other hand.

To do this, there can be programmed, in the electronic measuring housing 3, a collision threshold of a predetermined voltage value U, for example equal to 6 volts.

Then, in the case of contact of the probe 2 with the piece 5 to be cut, the voltage abruptly exceeds the working value, for example about 3 volts at the contact value, which is to say about 9 volts, and triggers the collision signal, which collision signal is immediately used by the electronic housing 3 to stop the movement of the tools and thereby avoid damage to them.

To do this, it suffices to add an electric card in the control electronic housing 3.

In this case, the capacitative probe fulfills two functions, namely, the function of a sensing detector at the beginning and during the operation of cutting, and the function of a collision detector at the end of the cutting operation.

What is claimed is:

1. An installation for working on at least one metallic workpiece, comprising:
   at least one fixed support frame;
   at least one movable working torch on said frame;
   at least one sensing device on said frame having at least one capacitative probe and drive means;
   a first elongated and electrically conductive connection means connected by an upstream end to said drive means and by a downstream end to said at least one capacitative probe; and
   a second elongated and electrically conductive connection means connected by an upstream end to said drive means and a downstream end being free.

2. The installation according to claim 1, wherein said first and said second connection means have substantially identical dielectric properties.

3. The installation according to claim 1, wherein said first connection means has a first length and said second connection means has a second length, said first and said second lengths being substantially equal.

4. The installation according to claim 3, wherein said first and said second lengths are between 20 cm and 150 cm.

5. The installation according to claim 1, wherein said first and said second connection means are separated by a distance d between 2 mm and 50 mm.

6. The installation according to claim 1, wherein said first and said second connection means are cables.

7. The installation according to claim 1, wherein said first and said second connection means are metallic rods.

8. The installation according to claim 1, wherein at least a portion of said first and said second connection means is disposed within a protective envelope.

9. The installation according to claim 1, wherein said at least one capacitative probe is fixed to said at least one working torch.

10. The installation according to claim 1, wherein said at least one working torch is a torch selected from the group consisting of laser cutting torches, plasma cutting torches, and oxycutting torches.

* * * * *